United States Patent [19]

Ahn

[11] Patent Number: 5,768,442
[45] Date of Patent: Jun. 16, 1998

[54] DIGITAL SIGNAL CONVERSION METHOD AND APPARATUS FOR CONVERTING PHOTOELECTRICALLY CONVERTED VIDEO SIGNALS

[75] Inventor: Byung-eue Ahn, Seoul, Rep. of Korea

[73] Assignee: Samsung Electronics Co., Ltd., Kyungki-Do, Rep. of Korea

[21] Appl. No.: 540,882

[22] Filed: Oct. 11, 1995

[30] Foreign Application Priority Data

Oct. 11, 1994 [KR] Rep. of Korea ............... 94-26016

[51] Int. Cl.$^6$ ............................................. G06K 9/36
[52] U.S. Cl. ............................................. 382/274; 382/276
[58] Field of Search .............................. 382/274, 276, 382/313, 312, 321; 248/257; 378/108

[56] References Cited

U.S. PATENT DOCUMENTS

| | | | |
|---|---|---|---|
| 3,946,223 | 3/1976 | Harada et al. | 348/311 |
| 5,185,656 | 2/1993 | Yamamoto | 348/257 |
| 5,194,960 | 3/1993 | Ota | 348/362 |
| 5,388,138 | 2/1995 | Fujiwara | 378/108 |

*Primary Examiner*—Yon J. Couso
*Attorney, Agent, or Firm*—Sughrue, Mion, Zinn, Macpeak & Seas, PLLC

[57] ABSTRACT

A digital signal conversion apparatus converts an input video signal having a first dynamic range into a converted video signal having a dynamic range which is smaller than the first dynamic range. In particular, the conversion apparatus includes a digital signal processor (DSP) and a knee point determiner. The DSP inputs the input video signal and converts such signal into the converted video signal based on a selected one of a plurality of input/output (I/O) characteristic functions stored in the DSP. Furthermore, the DSP generates brightness information based on the magnitude of the first dynamic range of input video signal. The knee point determiner inputs the brightness information and generates knee point information based on the brightness information. As a result, the DSP selects one of the I/O characteristic functions in accordance with the knee point information such that the DSP can appropriately convert the input video signal into the converted video signal.

29 Claims, 4 Drawing Sheets

DIGITAL SIGNAL CONVERSION METHOD AND APPARATUS FOR CONVERTING PHOTOELECTRICALLY CONVERTED VIDEO SIGNALS

FIELD OF THE INVENTION

The present invention relates to a digital signal conversion method and apparatus for converting photoelectrically converted video signals. More particularly the invention relates to a digital signal conversion method and apparatus for converting video signals such that the signals have magnitudes which fall within a dynamic range of a signal processing system.

BACKGROUND OF THE INVENTION

In order to process data corresponding to a video image, a video camera inputs optical signals corresponding to the image, and the optical signals are photoelectrically converted into electrical signals via charge coupled devices. Subsequently, the electrical signals are input to a signal processing system and processed in accordance with a particular application. However, since the dynamic range of the charge coupled devices is relatively large, the converted electrical signals typically have dynamic ranges which are broader than a dynamic range of the signal processing system. Accordingly, processing all of the electrical signals in such processing system is difficult.

In order to overcome the problem above, an apparatus has been developed which converts electrical signals having values which fall outside of the dynamic range of the signal processing system into electrical signals having all values within such range. Such a signal conversion apparatus is called an "automatic knee" apparatus and has a dynamic range of approximately 50–70 dB so that it is not significantly affected by noise.

Figure 1:
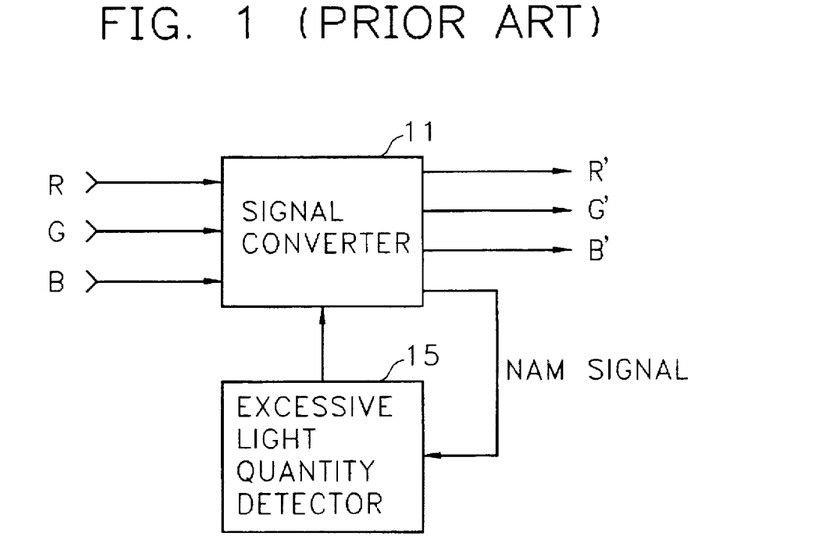
FIG. 1 is a block diagram of an analog signal conversion apparatus.

An example of an analog signal conversion apparatus which is used in an analog video camera will be described with reference to FIG. 1. As shown in the figure, the conversion apparatus comprises a signal converter 11 and an excessive light quantity detector 15. The signal converter 11 inputs red, green, and blue analog signals R, G, and B which correspond to optical signals that have been photoelectrically converted by charge coupled devices (not shown). Then, the converter 11 determines a maximum value from among the signals R, G, and B and generates a "NAM" signal corresponding to the maximum value.

The excessive light quantity detector 15 inputs the NAM signal and detects an amount by which the maximum value of the signals R, G, and B exceeds the dynamic range of the converter 11. In other words, the detector 15 determines an "excessive light quantity range" relating to the maximum value. In the present example, the dynamic range of the device 11 is equal to a range of output values between 0 and Q' (FIG. 2).

After the excessive light quantity range is determined, the detector 15 outputs a corresponding signal to the signal converter 11, and the converter 11 determines the value of a knee point KP and an input/output (I/O) characteristic based on the excessive light quantity range. For instance, the converter 11 may calculate the value of the knee point KP such that it is inversely proportional to the size of the excessive light quantity range. Specifically, if the size of the excessive light quantity range is relatively large, then the value of the knee point KP may correspond to a relatively small value within the dynamic range. Conversely, if the size of the excessive light quantity range is relatively small, then the value of the knee point may correspond to a relatively large value within the dynamic range.

Figure 2:
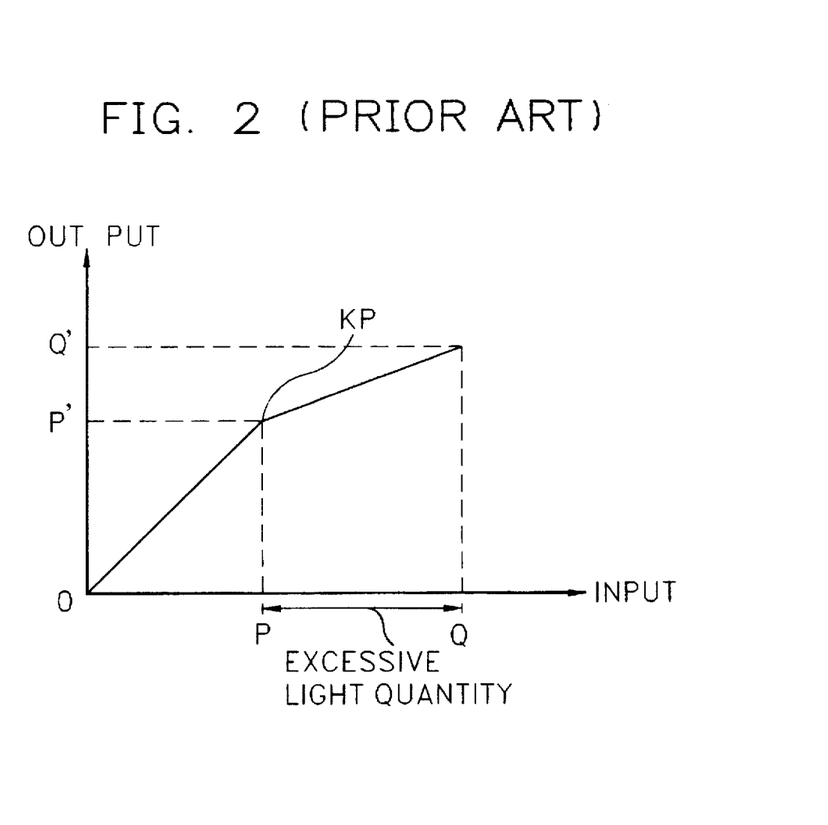
FIG. 2 shows an I/O characteristic curve for the signal conversion apparatus shown in FIG. 1.

FIG. 2 illustrates an example of a knee point KP and an I/O characteristic determined by the converter 11. As shown in the figure, the I/O characteristic has a portion A and a portion B, and the portions A and B are connected at the knee point KP. Accordingly, if the converter 11 inputs a signal having a value between O and P, the signal is converted to an output signal having a value between O and P' in accordance with portion A of the I/O characteristic. On the other hand, if a signal having a value between P and Q is input, the signal is transformed into an output signal having a value between P' and Q' based on portion B of the I/O characteristic. Thus, even if, an input signal has a value larger than the dynamic range of the signal processing system, the converter 11 manipulates the signal such that its value falls within such dynamic range. As a result, all of the input electrical signals R, G, and B having values beyond the dynamic range are converted into signals R', G', and B' having values within the dynamic range.

Even though the analog signal conversion apparatus is capable of effectively converting various input signals, such apparatus has several disadvantages. For instance, the analog apparatus comprises both passive elements (such as resistors and capacitors) and active elements (such as transistors). Therefore, the quality of the signals output from the apparatus is degraded due to discrepancies among the temperature characteristics of the passive and active elements. In addition, since the signal conversion apparatus processes the red, green, and blue signals R, G, and B via particular devices, uniformly processing the signals and limiting the excessive quantity range is difficult.

In order to solve the problems inherent in an analog signal conversion apparatus, a digital signal conversion apparatus has been developed for a digital video camera by the Matsushita company in Japan. The apparatus uses a plurality of look-up tables stored in a memory to convert an input signal into a signal within a dynamic range. However, since the device requires a plurality of different types of look-up tables to adequately convert signals based on variable knee points KP and I/O characteristics, a relatively large memory capacity is needed. As a result, such digital conversion device is relatively expensive.

SUMMARY OF THE INVENTION

In order to solve the problems above, one of the objects of the present invention is to provide a digital signal conversion method for converting an input video signal having a first dynamic range into a converted video signal within a predetermined dynamic range. Furthermore, such conversion is preferably based on one of a plurality of input/output characteristics which are programmed, such that an excessive light quantity range varies in accordance with each of the input/output characteristics.

Another object of the present invention is to provide a digital signal conversion apparatus for performing a method similar to the method above.

In order to accomplish one of the above objects of the present invention, a digital signal conversion method for converting an input video signal having a magnitude within a first dynamic range into a converted video signal having a magnitude within a second dynamic range is provided. Specifically, the digital signal conversion method comprises the steps of:

(a) storing input/output characteristics which respectively correspond to knee point information values;

(b) generating a particular knee point information value according to brightness information of said input video signal, wherein said brightness information corresponds to said first dynamic range of said input video signal; and (c) converting said input video signal into said converted video signal having said magnitude within said second dynamic range based on a particular input/output characteristic which corresponds to said particular knee point information value.

In order to accomplish another object of the present invention, a digital signal conversion apparatus is provided and comprises: knee point determination means for determining knee point information based on brightness information; and signal processing means for inputting said input video signal, outputting said brightness information according to said input video signal, and converting said input video signal into said converted video signal, wherein said input video signal has a first dynamic range which corresponds to said brightness information, wherein one of said signal processing means and a separate signal processing system has a second dynamic range, wherein an amount by which said first dynamic range exceeds said second dynamic range corresponds to an excessive light quantity range, wherein said signal processing means converts said input video signal into said converted video signal by using an input/output characteristic which corresponds to said excessive light quantity range, and wherein a size of said excessive light quantity range varies according to said knee point information.

BRIEF DESCRIPTION OF THE DRAWINGS

The preferred embodiments are described with reference to the drawings wherein.

DETAILED DESCRIPTION OF THE PREFERRED EMBODIMENT

A preferred embodiment of the present invention will be described below in more detail with reference to FIGS. 3, 4, and 5.

Figure 3:
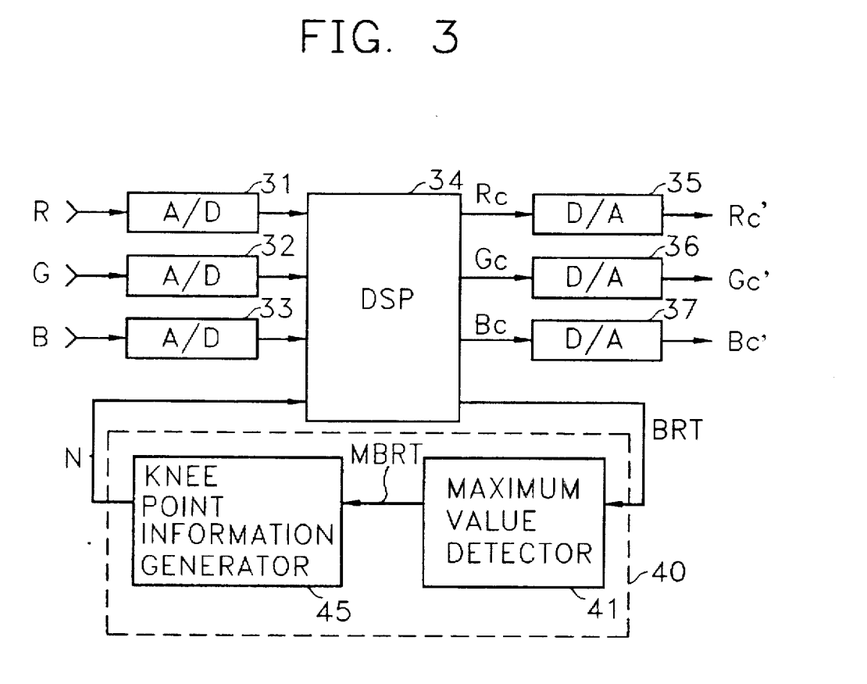
FIG. 3 is a block diagram showing a digital signal conversion apparatus according to a preferred embodiment of the present invention.

FIG. 3 shows a digital signal conversion apparatus according to a preferred embodiment of the present invention. In particular, the apparatus comprises analog-to-digital (A/D) converters 31, 32, and 33, a digital signal processor (DSP) 34, digital-to-analog (D/A) converters 35, 36, and 37, and a knee point determiner 40.

Optical signals corresponding to an image are photoelectrically converted into analog red, green, and blue signals R, G, and B by charge coupled devices (not shown). Afterwards, the analog signals R, G, and B are respectively converted into digital component data R, G, and B by the A/D converters 31, 32, and 33, and the digital component data R, G, and B are output to the DSP 34.

Subsequently, the DSP 34 generates brightness information BRT based on a video data block of the component data and outputs the brightness information BRT to the knee point determiner 40. The determiner 40 comprises a maximum value detector 41 and a knee point information generator 45. The detector 41 inputs the brightness information BRT for the video data block, determines the maximum value of the brightness information BRT, and outputs maximum brightness information MBRT based on the maximum value. The knee point information generator 45 inputs the maximum brightness information MBRT and outputs knee point information N based on such information MBRT.

Subsequently, the DSP 34 inputs the knee point information N and selects one of a plurality of prestored I/O characteristic functions based on the information N. Then, when the DSP 34 inputs another group of digital component data R, G, and B, the DSP 34 converts the data R, G, and B into converted digital component data Rc, Gc, and Bc based on the selected I/O characteristic function. The D/A converters 35, 36, and 37 input the digital data Rc, Gc, and Bc and transform the data Rc, Gc, and Bc into analog red, green, and blue signals Rc', Gc', and Bc'.

Figure 5:
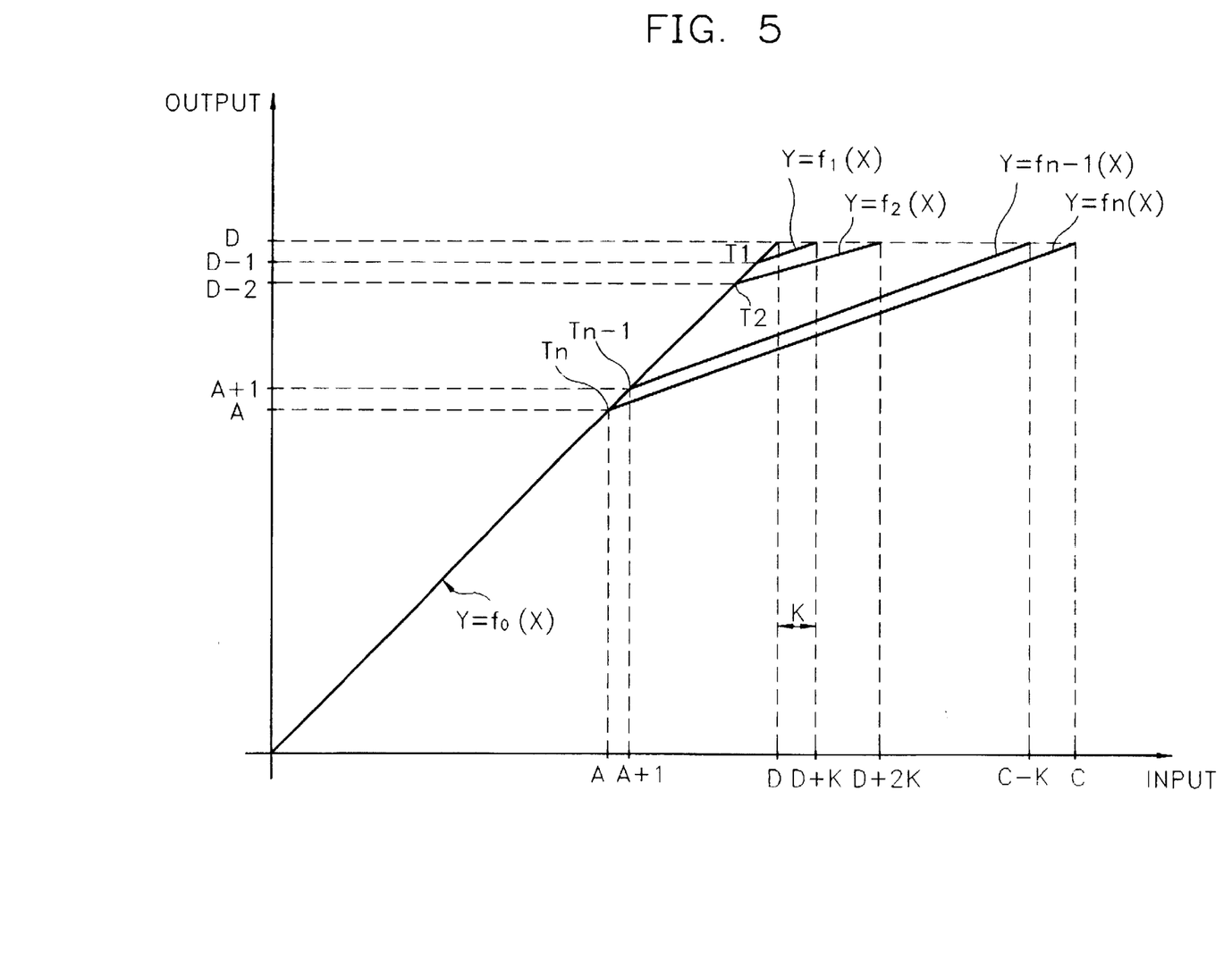
FIG. 5 shows I/O characteristic curves used by the digital signal conversion apparatus shown in FIG. 3.

An example of the pre-stored I/O characteristic functions $f_o$ through $f_n$ are illustrated in FIG. 5. As shown in the figure, the functions $f_1$ to $f_n$ respectively correspond to knee points $T_1$ to $T_n$, and the knee points $T_1$ to $T_n$ correspond to the possible values of the knee point information N (N=1 to n).

TABLE 1

| Condition | Knee point information |
| --- | --- |
| MBRT ≦ D | N = 0 |
| D < MBRT ≦ D + k | N = 1 |
| D + k < MBRT ≦ D + 2k | N = 2 |
| D + 2k < MBRT ≦ D + 3k | N = 3 |
| . | . |
| . | . |
| . | . |
| C − k < MBRT ≦ C | N = n |

For example, as illustrated in Table 1, if the value of the maximum brightness information MBRT output from the detector 41 indicates that the maximum value of the digital component data R, G, and B is less than the value "D" (i.e. within the dynamic range of the signal processing system), the knee point information generator 45 outputs knee point information N which equals "0". As a result, the DSP 34 converts the component data R, G, and B into the digital data Rc, Gc, and Bc based on the I/O characteristic function $Y=f_0(X)$.

On the other hand, if the information MBRT indicates that the maximum value of the digital component data is between the values "D" and "D+k" (i.e. slightly beyond the dynamic range of the processing system), the generator 45 outputs information N which equals "1". Accordingly, the DSP 34 converts the component data R, G, and B into the digital data Rc, Gc, and Bc based on the function $Y=f_1(X)$ and the knee point $T_1$. In other words, the DSP 34 converts all of the component data having values less than a critical value "D-1" corresponding to the knee point $T_1$ based on the function $Y=f_0(X)$. Furthermore, all of the component data having values greater than the critical value "D-1" are converted according to the function $Y=f_1(X)$.

In addition, if the information MBRT indicates that the maximum value of the digital component data is between the values "C-K" and "C" (i.e. substantially beyond the dynamic range of the signal processing system), the generator 45 outputs knee point information N which equals "n". Accordingly, the DSP 34 converts the component data R, G, and B into the digital data Rc, Gc, and Bc based on the function $Y=f_n(X)$ and the knee point $T_n$. Specifically, the DSP 34 converts each of the component data R, G, and B having a value less than a critical value A corresponding to the knee point $T_n$ based on the function $Y=f_0(X)$. Moreover, all of the component data having values greater than the critical value A are converted according to the function $Y=f_n(X)$.

In FIG. 5, the range of input values from "0" to "D" (or the range of output values "0" to "D") represents the dynamic range of the signal processing system. Furthermore, the range of input values "D" to "C" represents the excessive light quantity range which exceeds the dynamic range. In addition, as shown in Table 1 and FIG. 5, the number n corresponds to the number of predetermined intervals k into which the excessive light quantity range is divided.

Also, as shown by the I/O characteristic functions $Y=f_o(X)$ to $Y=f_n(X)$, the value of the maximum bright information MBRT is directly proportional to the value of the knee point information N. In particular, as the value of the information MBRT increases (or decreases), the value of the knee point information N also increases (or decreases).

Furthermore, the value of the knee point information N and the maximum brightness information MBRT are each directly proportional to the size of the excessive light quantity range. Specifically, as the information N and MBRT become larger (or smaller), the size of the excessive light quantity range likewise becomes larger (or smaller). For example, if the knee point information N equals "2", the excessive light quantity range spans from "D" to "D+2k", but if the information N equals "n" (n>2), the range spans from "D" to "C".

An operation of the digital signal conversion apparatus will be further described with reference to FIG. 4 and 5. As previously mentioned, a video camera inputs optical signals corresponding to an image, and the optical signals are photoelectrically converted into analog red, green, and blue signals R, G, and B via a photoelectric converter (not shown). Furthermore, the photoelectric converter (not shown) has a broader dynamic range than the dynamic range of the DSP 34 and/or various signal processing systems located downstream from the DSP 34.

The analog signals R, G, and B are converted into digital component data R, G, and B by the A/D converters 31, 32, and 33, and the digital data R, G, and B are input to the DSP 34. Then, the DSP 34 generates a NAM signal indicating the maximum value among the digital data R, G, and B. In the present embodiment, the NAM signal represents the maximum value among the digital data R, G, and B corresponding to respective pixels. Subsequently, the DSP 34 generates brightness information BRT which corresponds is to the average value of the NAM signals relating to respective video data blocks, each of which has a predetermined magnitude. In the present embodiment, each of the video data blocks is obtained by dividing one field or frame of a video image signal such that the field or frame has the above-mentioned predetermined magnitude.

The brightness information BRT represents the brightness of the respective video data blocks and is input to the maximum value detector 41. The detector 41 detects the maximum brightness information MBRT from among the brightness information BRT corresponding to each video block, and the information MBRT is output to the knee point information generator 45. Subsequently, the generator 45 determines the knee point information N corresponding to the maximum brightness information MBRT according to Table 1.

Figure 4:
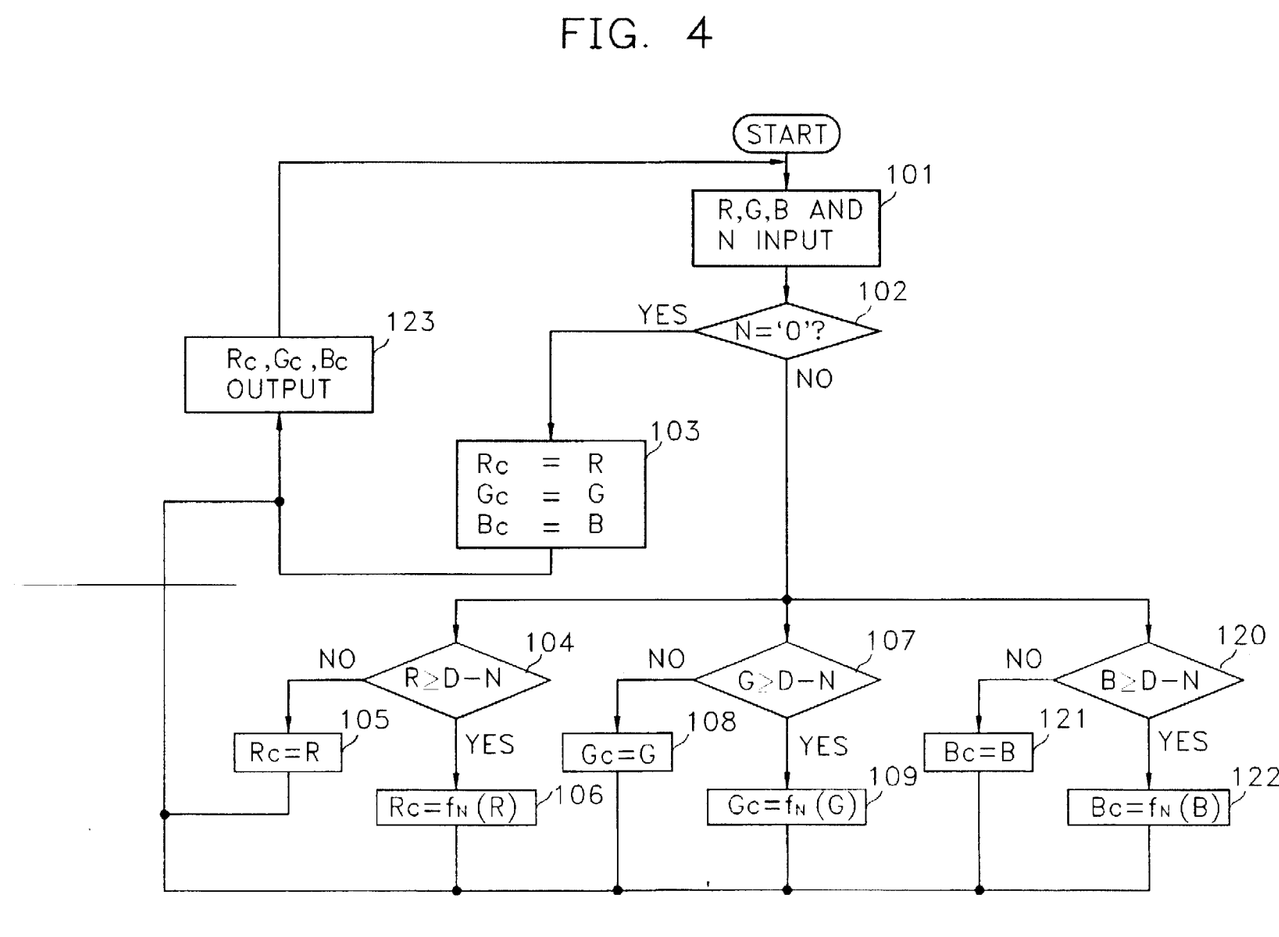
FIG. 4 is a flow chart for explaining an operation of a digital signal processor of the digital signal conversion apparatus shown in FIG. 3.

FIG. 4 illustrates a flow chart of the conversion operation performed by the DSP 34. In particular, the DSP 34 inputs the current knee point information N output from the generator 45. Furthermore, the DSP 34 inputs the digital component data R, G, and B corresponding to the field or frame of a video signal which follows the field or frame from which the current knee point information N was determined (step 101). Since the DSP 34 processes the data R, G, and B relating to frame or field which is after the frame or field used to calculate the knee point information N, the DSP 34 can process the data R, G, and B without experiencing any delay. In other words the digital signal conversion apparatus can process signals in real time.

Subsequently, the DSP 34 determines if the knee point information N equals "0" (step 102). If the information N does equal "0", the DSP 34 converts the component data R, G, and B into converted digital component data Rc, Gc, and Bc based solely on the I/O characteristic function $Y=f_o(X)$ shown in FIG. 5 (step 103). In a preferred embodiment of the present invention, the function $Y=f_o(X)$ is equivalent to the function Y=X. As a result, the data Rc, Gc, and Bc generated in step 103 are equal to the red, green, and blue component data R, G, and B input to DSP 34 in step 101.

On the other hand, if the knee point information N does not equal "0", the DSP 34 compares the red component data R with the critical value "D-N" corresponding to the knee point $T_N$ (step 104). Similarly, the DSP 34 compares the green and blue component data G and B with the critical value "D-N" (steps 107 and 120).

Since the operation performed in steps 104-106 is the same as the operations performed in steps 107-109 and 120-121, only the operation performed in steps 104-106 will be described. In particular, if the value of the red component data R is smaller than the critical value "D-N" (step 104), the DSP 34 converts the component data R into the component data Rc in accordance with the function $Rc=f_o(R)$ (step 105). On the other hand, if the value of the red component data R is greater than or equal to the critical value "D-N" (step 104), the DSP 34 converts the component data R into the component data Rc based on the function $Rc=f_N(R)$ (step 105).

For example, if the value of the knee point information N applied from the knee point determiner 40 equals "2", the DSP 34 compares the value of the red component data R with the critical value "D-2". If the value of the data R is less than the critical value "D-2", the DSP 34 converts the data R into the data Rc based on the function $Rc=f_o(R)$. However, if the value of the data R is greater than or equal to the critical value "D-2", the DSP 34 converts the data R into the data Rc in accordance with the function $Rc=f_2(R)$.

In step 123, the converted digital component data Rc, Gc, and Bc generated by the DSP 34 are respectively output to the D/A converters 35, 36, and 37. Then, the converters 35, 36, and 37 convert the digital data Rc, Gc, and Bc into analog signals Rc', Gc', and Bc'.

As illustrated above, the red, green, and blue component data R, G, and B processed by the DSP 34 correspond to the frame or field which follows the frame or field used for determining the current knee point information N. Furthermore, when new knee point information N is output from the determiner 40, the DSP 34 processes the red, green, and blue component data R, G and B relating to field or frame that follows the field or frame used to calculate the new knee point information N.

On the other hand, the above embodiment may be modified such that the field or frame which corresponds to the currently processed component data R, G and B is the same field or frame used to determine the current knee point information N. In this case, since the current data R, G, and B and the current knee point information N used during the processing of the current data R, G, and B correspond to the same field or frame, the input data R, G, and B can be converted more accurately.

As described above, the digital signal conversion apparatus compresses the values of the data which extend into the excessive light quantity range by using an internal program. Accordingly, the present invention can be implemented with a relatively small amount of hardware and does not require a vast amount of memory. Furthermore, the invention provides flexibility with respect to the development of a signal conversion apparatus which is specifically adapted to a particular system.

Furthermore, as the brightness information with respect to one field or frame of a video signal becomes larger, the data R, G, and B having values which extend further beyond the dynamic range of the system can be compressed such that the values fall within the dynamic range. As a result, the signal conversion apparatus can be easily modified based on the degree by which the value of the data R, G, and B extend beyond the dynamic range (i.e. based on the size of the excessive light quantity range).

In addition, the digital signal conversion apparatus of the present invention does not contain as many passive and active elements as a conventional analog apparatus. Accordingly, the reliability of the digital apparatus is relatively high.

Furthermore, the present invention is not limited any specific applications. For example, the signal conversion apparatus can be incorporated into a broadcasting camera, a commercial video camera, and a digital camcorder.

Also, it is to be understood that the above described embodiments of the invention are only illustrative and that modifications thereof may occur to those skilled in the art. Accordingly, the present invention is not to be regarded as limited to the embodiments disclosed herein, but is to be limited only as defined by the appended claims.

What is claimed is:

1. A digital signal conversion apparatus for converting an input video signal into a converted video signal, the apparatus comprising:

knee point determination means for automatically determining knee point information based on brightness information; and signal processing means for inputting said input video signal, outputting said brightness information according to said input video signal and converting said input video signal into said converted video signal wherein said input video signal has a first dynamic range which is directly proportional to said brightness information, wherein one of said signal processing means and a separate signal processing system has a second dynamic range, wherein an amount by which said first dynamic range exceeds said second dynamic range corresponds to an excessive light quantity range.

wherein said signal processing means converts said input video signal into said converted video signal by using an input/output characteristic which corresponds to said excessive light quantity range, and wherein a size of said excessive light quantity range varies according to said knee point information.

2. The digital signal conversion apparatus according to claim 1, wherein said knee point determination means determines said knee point information such that said knee-point information increases said size of said excessive light quantity range as a value of said brightness information increases.

3. The digital signal conversion apparatus according to claim 1, wherein said knee point determination means determines said knee point information in units of a field of said input video signal.

4. The digital signal conversion apparatus according to claim 2, wherein said knee point determination means determines said knee point information in units of a frame of said input video signal.

5. The digital signal conversion apparatus according to claim 2, wherein said knee point determination means comprises:

a maximum value detector for inputting said brightness information, determining a maximum value of said brightness information supplied from said signal processing means for a predetermined interval of time, and outputting maximum brightness information based on said maximum value; and a knee point information determiner for determining said knee point information in accordance with said maximum brightness information detected by said maximum value detector.

6. The digital signal conversion apparatus according to claim 2, wherein said first dynamic range of said input video signal has a relationship with respect to said knee point information such that said value of said knee point information chances as a value of said first dynamic range increases, and wherein said first dynamic range has a relationship with respect to said excessive light quantity range such that said size of said excessive light quantity range increases as said value of said first dynamic range increases.

7. The digital signal conversion apparatus according to claim 6, wherein said signal processing means is a digital signal processor which converts said input video signal into said converted video signal according to an internal program which relies upon said knee point information and said input video signal.

8. The digital signal conversion apparatus according to claim 1, further comprising, an analog-to-digital converter means for converting a photoelectrically converted video signal into said input video signal and supplying said input video signal to said signal processing means.

9. The digital signal conversion apparatus according to claim 8, wherein said analog-to-digital converter means comprises:

a first analog-to-digital converter for converting a photoelectrically converted red component signal into a digital red component signal and supplying said digital red component signal to said signal processing means;

a second analog-to-digital converter for converting a photoelectrically converted green component signal into a digital green component signal and supplying said digital green component signal to said signal processing means; and a third analog-to-digital converter for converting a photoelectrically converted blue component signal into a digital blue component signal and supplying said digital blue component signal to said signal processing means, wherein said photoelectrically converted video signal comprises said photoelectrically converted red, green, and blue component signals and wherein said input video signal comprises said digital red, green, and blue component signals.

10. A digital signal conversion method for converting an input video signal having a magnitude within a first dynamic range into a converted video signal having a magnitude within a second dynamic range said digital signal conversion method comprising the steps of:

(a) storing input/output characteristics which respectively correspond to knee point information values;

(b) generating a particular knee point information value according to brightness information of said input video signal, wherein said brightness information corresponds to said first dynamic range of said input video signal; and (c) converting said input video signal into said converted video signal having said magnitude within said second dynamic range based on a particular input/output characteristic which corresponds to said particular knee point information value.

11. The digital signal conversion method according to claim 10, wherein:

an amount by which said first dynamic range exceeds said second dynamic range corresponds to a size of an excessive light quantity range, and said particular knee point information value chances as said brightness information increases, and said size of said excessive light quantity range increases as said brightness information increases.

12. The digital signal conversion method according to claim 11, wherein said step (b) comprises the steps of:

(b1) establishing a relationship between values of said brightness information and said knee point information values so that said knee point information values increase as said values of said brightness information increases;

(b2) detecting maximum values, wherein said maximum values respectively correspond to one of red, green, and blue color component signals which has a highest value during each of a plurality of predetermined intervals, wherein said input video signal comprises said red, green, and blue component signals, and wherein each of said predetermined intervals is smaller than an interval of one field of said input video signal;

(b3) calculating brightness information which relates to an average of a plurality said maximum values detected during said predetermined intervals; and (b4) determining a maximum brightness information from among said brightness information calculated during an interval of said one field;

(b5) determining said particular knee point information value based on said maximum brightness information.

13. The digital signal conversion method according to claim 11, wherein said step (b) comprises the steps of:

(b1) establishing a relationship between values of said brightness information and said knee point information values so that said knee point information values increase as said values of said brightness information increases;

(b2) detecting maximum values, wherein said maximum values respectively correspond to one of red, green, or blue color component signals which has a highest value during each of a plurality of predetermined intervals, wherein said input video signal comprises said red, green, and blue component signals, and wherein each of said predetermined intervals is smaller than an interval of one frame of said input video signal;

(b3) calculating brightness information which relates to an average of a plurality said maximum values detected during said predetermined intervals; and (b4) determining a maximum brightness information from among said brightness information calculated during an interval of said one frame;

(b5) determining said particular knee point information value based on said maximum brightness information.

14. The digital signal conversion method according to claim 11, wherein an amount of said excessive light quantity range which is within said second dynamic range increases as said brightness information increases.

15. A digital signal conversion apparatus for converting an input video signal into a converted video signal, the apparatus comprising:

signal processing means for inputting said input video signal and converting said video signal into said converted video signal, wherein said input video signal has first brightness values within a first dynamic range and said converted video signal has second brightness values within a second dynamic range, wherein said signal processing means contains a plurality input/output characteristic functions, selects one of said input/output characteristic functions as a selected input/output characteristic function, and converts said first brightness values within said first dynamic range into said converted video signal having second brightness values within said second dynamic range in accordance with said selected input/output characteristic function, and wherein said signal processing means outputs brightness information based on said first brightness values of said input video signal; and knee point determination means for inputting said brightness information, selecting a selected knee point information value from among a plurality of knee point information values based on said brightness information, and outputting said selected knee point information value, wherein said signal processing means inputs said selected knee point information value and selects said selected input/output characteristic function based on said selected knee point information value.

16. The digital signal conversion apparatus according to an amount by which said first dynamic range exceeds said second dynamic range corresponds to an excessive light quantity range, and said knee point determination means selects said selected knee point information value such that said selected knee point information value corresponds to a size of said excessive light quantity range.

17. The digital signal conversion apparatus according to claim 15, wherein said knee point determination means comprises:

a maximum value detector, wherein said maximum value detector respectively inputs a plurality of segmented portions of said brightness information during a plurality of first predetermined intervals of said input video signal, wherein said plurality of first predetermined intervals forms a second predetermined interval, and wherein said maximum value detector determines which one of said segmented portions of said brightness information has a maximum value and outputs a maximum brightness information corresponding to said second predetermined interval based on said one of said segmented portions; and a knee point information generator which inputs said maximum brightness information and generates said knee point information value based on said maximum brightness information.

18. The digital signal conversion apparatus according to claim 16, wherein said selected input/output characteristic function comprises a first portion and a second portion which are connected by said selected knee point information value, wherein said selected knee point information value corresponds to a critical value of said first brightness values within said first dynamic range, wherein said first brightness values which are less than said critical value are converted into a first group of said second brightness values of said second dynamic range in accordance with said first portion of said selected input/output characteristic function, and wherein said first brightness values which are greater than or equal to said critical value are converted into a second group of said second brightness values in accordance with said second portion of said selected input/output characteristic function.

19. The digital signal conversion apparatus according to claim 18, wherein a relationship between said critical value and said excessive light quantity range is such that said critical value becomes smaller as said size of said excessive light quantity range becomes larger.

20. The digital signal conversion apparatus according to claim 18, wherein a relationship between said critical value and said selected knee point information value is such that said critical value becomes smaller as said selected knee point information value becomes larger.

21. The digital signal conversion apparatus according to claim 16, wherein a relationship between said excessive light quantity range and said selected knee point information value is such that said size of said excessive light quantity range becomes smaller as said selected knee point information value becomes smaller.

22. The digital signal conversion apparatus according to claim 18, wherein said first portion of said selected input/output characteristic function is a first linear function having a first slope and said second portion of said selected input/output characteristic function is a second linear function having a second slope.

23. The digital signal conversion apparatus according to claim 22, wherein said first slope is greater than said second slope.

24. The digital signal conversion apparatus according to claim 23, wherein said second linear function compresses said first brightness values which are greater than said critical value such that a greatest brightness value of said first brightness values is not greater than a greatest brightness value of said second brightness values.

25. The digital signal conversion apparatus of claim 15, wherein said brightness information has a direct proportional relationship with said first dynamic range.

26. The digital signal conversion apparatus according to claim 5, wherein said excessive light quantity range includes a plurality of regions when said first dynamic range exceeds said second dynamic range and wherein said knee point information is determined based on which of said plurality of regions contains the maximum brightness information.

27. The digital signal conversion apparatus according to claim 26, wherein said plurality of regions each are of equal width.

28. The digital signal conversion method according to claim 12, wherein said excessive light quantity range includes a plurality of regions when said first dynamic range exceeds said second dynamic range and wherein said particular knee point information value is determined based on which of said plurality of regions contains said maximum brightness information.

29. The digital signal conversion method according to claim 28, wherein said plurality of regions each are of equal width.

* * * * *